(12) United States Patent
Funahashi et al.

(10) Patent No.: US 11,493,094 B2
(45) Date of Patent: Nov. 8, 2022

(54) CONSTANT VELOCITY UNIVERSAL JOINT

(71) Applicant: NTN CORPORATION, Osaka (JP)

(72) Inventors: Masashi Funahashi, Shizuoka (JP); Shin Tomogami, Shizuoka (JP)

(73) Assignee: NTN CORPORATION, Osaka (JP)

( * ) Notice: Subject to any disclaimer, the term of this patent is extended or adjusted under 35 U.S.C. 154(b) by 364 days.

(21) Appl. No.: 16/643,899

(22) PCT Filed: Sep. 20, 2018

(86) PCT No.: PCT/JP2018/034857
§ 371 (c)(1),
(2) Date: Mar. 3, 2020

(87) PCT Pub. No.: WO2019/059291
PCT Pub. Date: Mar. 28, 2019

(65) Prior Publication Data
US 2020/0271168 A1    Aug. 27, 2020

(30) Foreign Application Priority Data

Sep. 22, 2017 (JP) .............................. JP2017-182312

(51) Int. Cl.
*F16D 3/30* (2006.01)
*F16D 3/84* (2006.01)
(Continued)

(52) U.S. Cl.
CPC ................ *F16D 3/30* (2013.01); *F16D 1/116* (2013.01); *F16D 3/84* (2013.01);
(Continued)

(58) Field of Classification Search
CPC ... F16D 3/30; F16D 1/116; F16D 3/84; F16D 2003/22313; Y10S 464/906; Y10T 403/58
(Continued)

(56) References Cited

U.S. PATENT DOCUMENTS 8,070,613 B2 * 12/2011 Cermak ................ F16D 3/2237
464/182
8,864,591 B2 * 10/2014 Sugiyama ............... F16D 1/116
464/906

(Continued)

FOREIGN PATENT DOCUMENTS

FI          23979   *  5/1950 ..................... 403/315
JP       5174153      4/2013
(Continued)

OTHER PUBLICATIONS

International Search Report dated Dec. 4, 2018 in International (PCT) Application No. PCT/JP2018/034857.
(Continued)

*Primary Examiner* — Greg Binda
(74) *Attorney, Agent, or Firm* — Wenderoth, Lind & Ponack, L.L.P.

(57) ABSTRACT

A constant velocity universal joint has an outer joint member and an inner joint member that transmits torque while permitting angular displacement due to balls between the inner and outer joint members. An attaching and detaching mechanism for attaching and detaching a power transmission shaft to and from the inner joint member is provided between the inner joint member and the power transmission shaft such that torque can be transmitted between the two. The attaching and detaching mechanism has a cylindrical member that fits over the power transmission shaft, a retaining ring that is radially movable, and an annular member that is axially movable. By using a boot band to fixedly tighten, to the power transmission shaft, a small diameter end portion of a boot closing an opening portion of the outer joint member, the axial position of the annular member is restricted by the small diameter end portion.

4 Claims, 6 Drawing Sheets

(51) Int. Cl.
*F16D 1/116* (2006.01)
*F16D 3/223* (2011.01)
(52) U.S. Cl.
CPC . *F16D 2003/22313* (2013.01); *Y10S 464/906* (2013.01); *Y10T 403/58* (2015.01)
(58) Field of Classification Search
USPC .......................................................... 464/182
See application file for complete search history.

(56) References Cited

U.S. PATENT DOCUMENTS

| | | |
|---|---|---|
| 11,181,150 B2* | 11/2021 | Tomogami .............. F16D 1/116 |
| 2010/0143075 A1 | 6/2010 | Disser |
| 2014/0349771 A1 | 11/2014 | Oh |
| 2019/0128333 A1* | 5/2019 | Tomogami .............. F16D 3/224 |

FOREIGN PATENT DOCUMENTS

| | | |
|---|---|---|
| JP | 5818390 | 11/2015 |
| WO | 2017/134981 | 8/2017 |

OTHER PUBLICATIONS

International Preliminary Report on Patentability and Written Opinion of the International Searching Authority dated Dec. 4, 2018 in International (PCT) Application No. PCT/JP2018/034857.

\* cited by examiner

CONSTANT VELOCITY UNIVERSAL JOINT

TECHNICAL FIELD

The present invention relates to a constant velocity universal joint that is used in a power transmission system of an automobile or various industrial machines, and is particularly incorporated into an automotive propeller shaft.

BACKGROUND ART

There are two types of constant velocity universal joints that are used as means for transmitting rotational force from an automobile engine to a wheel at a constant speed: a fixed type constant velocity universal joint and a plunging type constant velocity universal joint. Both of these constant velocity universal joints have a configuration in which two shafts on a driving side and a driven side are connected to each other, such that rotational torque can be transmitted at a constant speed even when the two shafts have an operating angle.

A propeller shaft incorporated into an automobile needs to cope with angular displacement and axial displacement caused by a change in a relative positional relationship between a transmission and a differential.

Therefore, in general, the propeller shaft is equipped with the fixed type constant velocity universal joint permitting only the angular displacement on a transmission side and the plunging type constant velocity universal joint permitting both the axial displacement and the angular displacement on a differential side. The propeller shaft has a configuration in which both of the constant velocity universal joints are connected to each other by a propeller shaft member.

The fixed type constant velocity universal joint includes an outer joint member, an inner joint member, a plurality of balls, and a cage. A power transmission shaft, which is an output shaft extending from the transmission, is connected to a shaft hole of the inner joint member by spline fitting in such a way that torque can be transmitted. This power transmission shaft is prevented from slipping off from the inner joint member by a retaining ring.

Conventionally, various connection configurations have been proposed as a connection configuration of the power transmission shaft and the constant velocity universal joint in the propeller shaft (see, for example, Patent Literatures 1 and 2).

In the connection configuration disclosed in Patent Literature 1, an inner joint member of a constant velocity universal joint is extended on a side of a power transmission shaft in an axial direction, and the inner joint member and the power transmission shaft are fixed to each other by a retaining ring at a position other than a spline fitting part between the inner joint member and the power transmission shaft.

In the connection configuration disclosed in Patent Literature 2, a drive sleeve is connected to an inner joint member of a constant velocity universal joint by spline fitting in such a way that torque can be transmitted, a drive nut is connected to a power transmission shaft, and the drive nut is fitted to the drive sleeve.

CITATIONS LIST

Patent Literature

Patent Literature 1: JP 5174153 B2
Patent Literature 2: JP 5818390 B2

SUMMARY OF INVENTION

Technical Problems

For parts replacement or maintenance of the propeller shaft, the constant velocity universal joint needs to be attachable to and detachable from the power transmission shaft of the transmission. The connection configurations of the power transmission shafts and the constant velocity universal joints disclosed in Patent Literatures 1 and 2 described above have the following problems.

In the connection configuration disclosed in Patent Literature 1, a chamfer or roundness is provided on the retaining ring or a retaining ring groove, such that a slip-off resisting force of the power transmission shaft is secured and the power transmission shaft and the inner joint member of the constant velocity universal joint can be separated from each other.

However, it is significantly difficult to design and control a form and a dimension of the chamfer or the like of the retaining ring and the retaining ring groove in order to stabilize a slip-off prevention performance by using the retaining ring. Designing and controlling an optimum form and dimension is thus difficult.

In the connection configuration disclosed in Patent Literature 2, the drive nut of the power transmission shaft is fitted to the drive sleeve extending from the inner joint member of the constant velocity universal joint. This allows the constant velocity universal joint to be securely fixed to the power transmission shaft and allows the constant velocity universal joint to be easily separated from the power transmission shaft.

However, a fitting configuration including the drive sleeve and the drive nut requires parts of the drive sleeve and the drive nut. This increases the number of parts of the propeller shaft and costs of the propeller shaft.

The present invention has been proposed in light of the above, and has an object to provide a constant velocity universal joint capable of securely fixing and easily separating an inner joint member and a power transmission shaft by a simple configuration.

Solutions to Problems

A constant velocity universal joint according to the present invention includes an outer joint member and an inner joint member that transmits torque while permitting angular displacement by means of a torque transmission member between the inner joint member and the outer joint member, and a power transmission shaft joined to the inner joint member in such a way that torque can be transmitted. The constant velocity universal joint has a configuration in which an attaching and detaching mechanism is provided between the inner joint member and a power transmission shaft. The attaching and detaching mechanism attaches and detaches the power transmission shaft to and from the inner joint member.

As a technical means to achieve the above object, the attaching and detaching mechanism according to the present invention includes a cylindrical member that fits over the power transmission shaft, a fixing member accommodated in the cylindrical member so as to be radially movable, and an annular member disposed on an outer circumference of the cylindrical member so as to be axially movable. An end portion of a boot that closes an opening portion of the outer joint member is fixedly tightened to the power transmission shaft by a boot band, and an axial position of the annular member is restricted by the end portion of the boot.

The attaching and detaching mechanism according to the present invention, which includes the cylindrical member, the fixing member, and the annular member, radially moves the fixing member in the cylindrical member by an axial movement of the annular member. This allows the fixing member to be attachable to and detachable from the power transmission shaft. By attaching and detaching this fixing member, the power transmission shaft and the inner joint member are fixed to and separated from each other.

When the power transmission shaft and the inner joint member are fixed to each other, the end portion of the boot that closes the opening portion of the outer joint member is fixedly tightened to the power transmission shaft by the boot band to restrict the axial position of the annular member by the end portion of the boot.

This can stably fix the power transmission shaft and the inner joint member. At the same time, this serves to prevent leakage of lubricant enclosed in the outer joint member and intrusion of foreign material from outside.

The boot according to the present invention preferably configures a sealing mechanism with a metal ring attached to the outer joint member, and includes a small diameter end portion fixedly tightened to the power transmission shaft and a large diameter end portion fixedly fastened to the metal ring.

By adopting this configuration, the small diameter end portion of the boot that configures part of the sealing mechanism has both a sealing function for preventing leakage of the lubricant and intrusion of foreign material, and a fixing function for restricting the axial position of the annular member with respect to the power transmission shaft.

In the present invention, preferably, a recess is formed on an outer circumferential surface of the cylindrical member, and an end portion of the annular member is locked to a stepped portion located on a side of the inner joint member of the recess.

By adopting this configuration, the annular member is axially interposed and fixed between the stepped portion of the recess of the cylindrical member and the end portion of the boot, and then the axial position of the annular member is securely restricted.

In the present invention, preferably, the end portion of the annular member is locked to an end surface of the inner joint member.

By adopting this configuration, the annular member is axially interposed and fixed between the end surface of the inner joint member and the end portion of the boot, and then the axial position of the annular member is securely restricted.

Advantageous Effects of Invention

In the present invention, the attaching and detaching mechanism that attaches and detaches the power transmission shaft to and from the inner joint member includes the cylindrical member, the fixing member, and the annular member. The inner joint member and the power transmission shaft are thus securely fixed to and easily separated from each other by the simple configuration. This enhances flexibility in designing the attaching and detaching mechanism.

Further, the end portion of the boot is fixedly tightened to the power transmission shaft by the boot band, and the axial position of the annular member is thus restricted by the end portion of the boot. Therefore, the power transmission shaft and the inner joint member are securely fixed to each other, and at the same time, leakage of the lubricant and intrusion of foreign material are prevented. This can achieve a decreased number of parts, and decreased costs and enhanced assembling efficiency of the constant velocity universal joint.

DESCRIPTION OF EMBODIMENTS

Embodiments of a constant velocity universal joint according to the present invention will now be described based on the drawings.

An embodiment below exemplifies a Rzeppa type constant velocity universal joint (BJ), which is one of fixed type constant velocity universal joints incorporated into an automotive propeller shaft. However, the embodiment is also applicable to an undercut free type constant velocity universal joint (UJ) as another fixed type constant velocity universal joint.

In addition, the embodiment is also applicable to a double offset type constant velocity universal joint (DOJ), a cross groove type constant velocity universal joint (11), and a tripod type constant velocity universal joint (TJ) as plunging type constant velocity universal joints.

A propeller shaft incorporated into an automobile, such as a 4WD vehicle or an FR vehicle, needs to cope with an angular displacement and an axial displacement caused by a change in a relative positional relationship between a transmission and a differential.

Therefore, in general, the propeller shaft is equipped with the fixed type constant velocity universal joint permitting only the angular displacement on the transmission side and the plunging type constant velocity universal joint permitting both the axial displacement and the angular displacement on the differential side. The propeller shaft has a configuration in which both of the constant velocity universal joints are connected to each other by a propeller shaft member made of steel.

Figure 1:
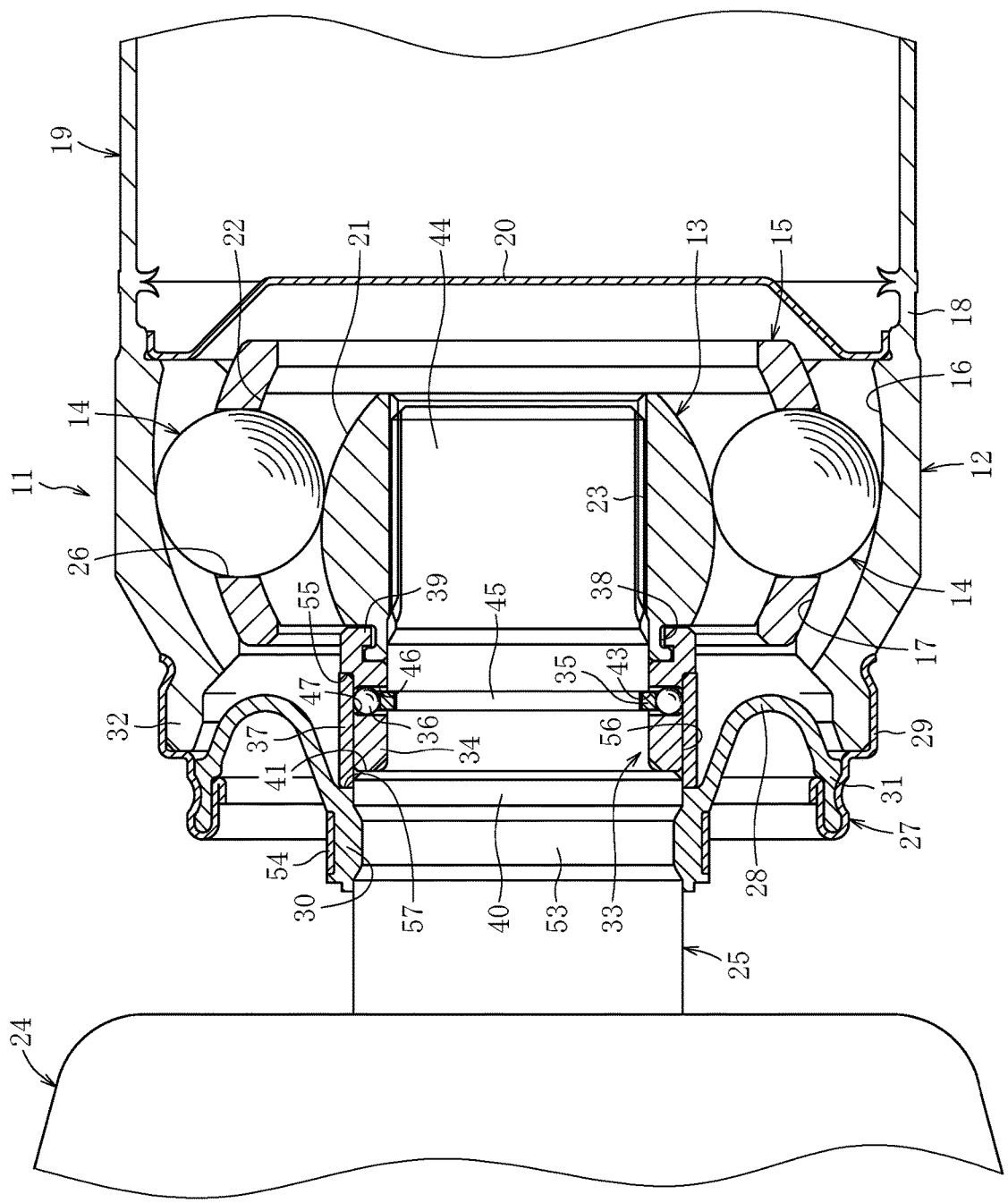
FIG. 1 is a cross-sectional view illustrating an overall configuration of a constant velocity universal joint according to an embodiment of the present invention.

A fixed type constant velocity universal joint 11 (hereinafter referred to simply as a constant velocity universal joint) according to this embodiment, as illustrated in FIG. 1, has a major section including an outer joint member 12, an inner joint member 13, a plurality of balls 14 as a torque transmission member, and a cage 15.

In the outer joint member 12, track grooves 16 having an arc shape and extending in the axial direction are formed at a plurality of positions at equal intervals in a circumferential direction of an inner circumferential surface 17 having a spherical shape. A propeller shaft member 19 having a pipe-like shape is coaxially joined to one opening end portion 18 of the outer joint member 12 by friction welding or the like in such a way that torque can be transmitted. Further, a seal plate 20 is attached to the opening end portion 18 by press-fitting to enclose lubricant such as grease in the outer joint member 12.

In the inner joint member 13, track grooves 21 having an arc shape and extending in the axial direction in pairs with the track grooves 16 of the outer joint member 12 are formed at a plurality of positions at equal intervals in the circumferential direction of an outer circumferential surface 22 having a spherical shape. A power transmission shaft 25, which is an output shaft extending from a transmission 24, is connected to a shaft hole 23 of the inner joint member 13 by spline fitting in such a way that torque can be transmitted. The power transmission shaft 25 is attachable to and detachable from the inner joint member 13 by an attaching and detaching mechanism 33.

The ball 14 is interposed between the track groove 16 of the outer joint member 12 and the track groove 21 of the inner joint member 13. The ball 14 transmits rotational torque between the outer joint member 12 and the inner joint member 13. The number of the balls 14 may be 6, 8, or any other, and is arbitrary.

The cage 15 is interposed between the inner circumferential surface 17 of the outer joint member 12 and the outer circumferential surface 22 of the inner joint member 13. In the cage 15, a plurality of pockets 26 that retains the ball 14 is formed at a plurality of positions at equal intervals in a circumferential direction.

In the constant velocity universal joint 11, when the propeller shaft member 19 creates an operating angle between the outer joint member 12 and the inner joint member 13, the ball 14 retained in the cage 15 is always maintained in a bisecting plane of any operating angle.

Consequently, a constant velocity between the outer joint member 12 and the inner joint member 13 is secured. Rotation torque is transmitted between the outer joint member 12 and the inner joint member 13 by means of the ball 14 while constant velocity is secured.

The constant velocity universal joint 11 is equipped with a sealing mechanism 27 between the outer joint member 12 and the power transmission shaft 25 to prevent leakage of the lubricant enclosed in the outer joint member 12 and intrusion of foreign material from outside.

The lubricant is enclosed in an inner space of the outer joint member 12 to secure lubricity at a plunging part in the joint when the power transmission shaft 25 rotates while keeping the operating angle with respect to the outer joint member 12.

This constant velocity universal joint 11 is incorporated into the propeller shaft, and thus has a small operating angle at rapid rotation. The sealing mechanism 27 described above thus includes a boot 28 made from rubber and a metal ring 29.

The boot 28 includes a small diameter end portion 30 and a large diameter end portion 31, and is formed in a substantial U-shape that is folded in the middle. One end portion of the metal ring 29 is fixed to an outer circumferential surface of an opening end portion 32 of the outer joint member 12 by press-fitting, and the other end portion of the metal ring 29 is fixedly fastened to the large diameter end portion 31 of the boot 28.

A recessed groove 53 having an annular shape is formed on an outer circumferential surface of a large diameter portion 40 of the power transmission shaft 25. The small diameter end portion 30 of the boot 28 is fitted into the recessed groove 53, having an annular shape, of the power transmission shaft 25, and fixedly tightened to the power transmission shaft 25 by a boot band 54 made of metal.

For parts replacement or maintenance of the propeller shaft in which the constant velocity universal joint 11 is attached to the propeller shaft member 19, the attaching and detaching mechanism 33 that attaches and detaches the constant velocity universal joint 11 to and from the power transmission shaft 25 of the transmission 24 is necessary. The constant velocity universal joint 11 according to this embodiment is equipped with the attaching and detaching mechanism 33 as follows.

Figure 2:
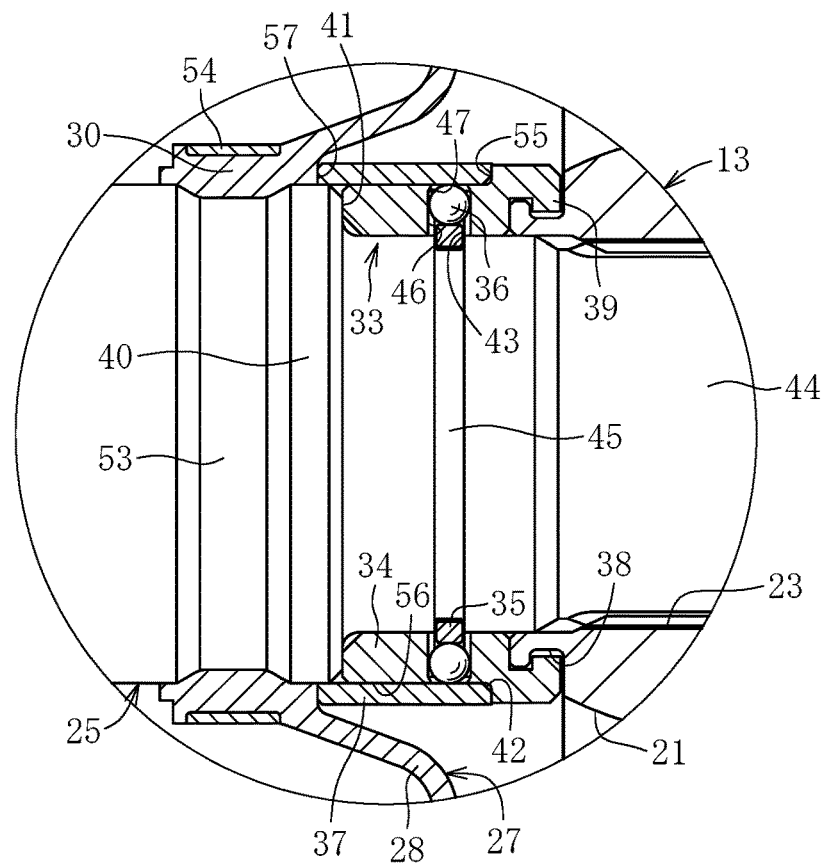
FIG. 2 is an enlarged cross-sectional view of a major part of FIG. 1.

As illustrated in FIGS. 1 and 2, the attaching and detaching mechanism 33 according to this embodiment is provided between the inner joint member 13 of the constant velocity universal joint 11 and the power transmission shaft 25 of the transmission 24, and has a major section including a cylindrical member 34, a retaining ring 35 as a fixing member, a sphere 36, and an annular member 37.

As described above, this simple configuration including the cylindrical member 34, the retaining ring 35, the sphere 36, and the annular member 37 allows the inner joint member 13 and the power transmission shaft 25 to be securely fixed to and easily separated from each other. This enhances flexibility in designing the attaching and detaching mechanism 33.

The cylindrical member 34 fits over the power transmission shaft 25. A locking groove 38 having an annular shape is provided on an outer circumferential surface of a transmission side end portion of the inner joint member 13. Also, a locking claw 39 having an annular shape is provided on an inner circumferential surface of a propeller shaft member side end portion of the cylindrical member 34.

The locking claw 39 of the cylindrical member 34 is fitted into the locking groove 38 of the inner joint member 13, and the inner joint member 13 and the cylindrical member 34 are connected to each other. An axial position of the cylindrical member 34 is restricted by a stepped surface 41 of the large diameter portion 40 of the power transmission shaft 25, while the cylindrical member 34 is connected to the inner joint member 13.

This embodiment exemplifies the cylindrical member 34, which is independent of the inner joint member 13. However, the cylindrical member 34 may be integrated with the inner joint member 13. The cylindrical member 34 configured independently of the inner joint member 13 allows the cylindrical member 34 to be easily manufactured in terms of processing.

Examples of materials of the cylindrical member 34 include low carbon steel, brass, aluminum, and resin, which has required axial yield strength (for example, about 2000 N at maximum), and does not cause deformation of or damage to the locking claw 39.

Considering incorporating efficiency of the retaining ring 35 and the sphere 36, manufacturing efficiency, and processing costs, a molded product of thermoplastic resin, such as nylon with high elasticity, is most preferable.

The retaining ring 35 is a substantially C-shaped member that is capable of reducing its diameter and is placed inside the cylindrical member 34. A recessed groove 43 having an annular shape is formed on an inner circumferential surface of the cylindrical member 34, and the retaining ring 35 is fitted into the recessed groove 43. The retaining ring 35 is thus placed inside the cylindrical member 34.

When the diameter of the retaining ring 35 is increased, the whole retaining ring 35 is accommodated in the recessed groove 43 of the cylindrical member 34. When the diameter of the retaining ring 35 is reduced, an outer circumferential side of the retaining ring 35 is partially accommodated in the recessed groove 43 of the cylindrical member 34.

Meanwhile, a recessed groove 45 having an annular shape is formed on an outer circumferential surface of the power transmission shaft 25 between the spline fitting part 44 and the large diameter portion 40 so as to match an axial position of the recessed groove 43 of the cylindrical member 34. The retaining ring 35 with the reduced diameter is fitted into the recessed groove 45, whereby the retaining ring 35 is locked to the power transmission shaft 25.

When the diameter of the retaining ring 35 is increased, the retaining ring 35 is not accommodated in the recessed groove 45 of the power transmission shaft 25. When the diameter of the retaining ring 35 is reduced, an inner circumferential side of the retaining ring 35 is partially accommodated in the recessed groove 45 of the power transmission shaft 25.

The sphere 36 is disposed so as to be radially movable with the retaining ring 35 on a radial outer side of the retaining ring 35. A through hole 46 that is open to inner and outer circumferences of the cylindrical member 34 is formed at a plurality of positions in a circumferential direction of the cylindrical member 34. The sphere 36 is disposed in the through hole 46.

This allows a radial inner side of the sphere 36 to come into contact with the retaining ring 35, and also allows a radial outer side of the sphere 36 to protrude to and retract from an outer circumferential side opening portion 47 of the through hole 46. Note that the number of the spheres 36 is preferably three or more, such that the diameter of the retaining ring 35 is uniformly reduced.

As described above, the sphere 36 is disposed in the through hole 46 of the cylindrical member 34, and the diameter of the retaining ring 35 is reduced by a movement of the sphere 36 to the radial inner side when the power transmission shaft 25 and the inner joint member 13 are fixed to each other. Further, when the power transmission shaft 25 and the inner joint member 13 are separated from each other, the sphere 36 moves to the radial outer side, and the diameter of the retaining ring 35 is increased by the elastic force of the retaining ring 35.

The through hole 46 of the cylindrical member 34 reduces an inner diameter of the outer circumferential side opening portion 47 of the cylindrical member 34 to be slightly smaller than an outer diameter of the sphere 36.

Figure 3:
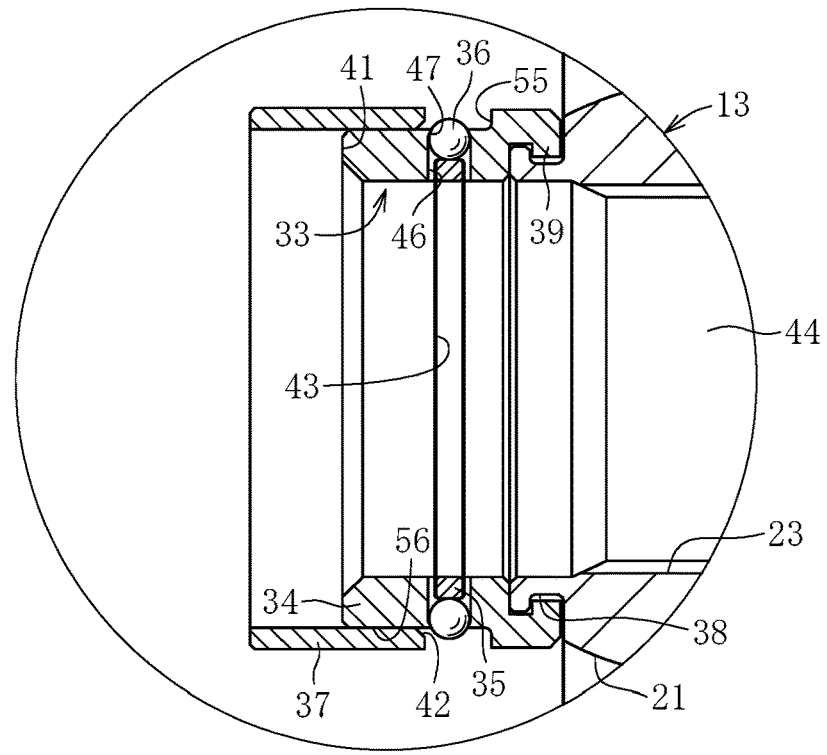
FIG. 3 is a cross-sectional view illustrating a state before a power transmission shaft is inserted into an inner joint member in an attaching and detaching mechanism of FIG. 2.

As illustrated in FIG. 3, when the sphere 36 is not restrained on the radial outer side by the annular member 37, the sphere 36 moves to the radial outer side by the elastic force of the retaining ring 35 to be exposed to the outer circumferential surface of the cylindrical member 34. This prevents the sphere 36 from dropping off outside the cylindrical member 34.

The annular member 37 is disposed on the outer circumferential surface of the large diameter portion 40 of the power transmission shaft 25 and the outer circumferential surface of the cylindrical member 34 so as to be axially movable. A recess 56 having an annular shape is formed on the outer circumferential surface of the cylindrical member 34, and a stepped portion 55 is provided on a propeller shaft member side of the recess 56. The annular member 37 fits over the recess 56 of the cylindrical member 34.

As illustrated in FIGS. 1 and 2, the propeller shaft member side end portion of the annular member 37 is locked to the stepped portion 55 of the recess 56 of the cylindrical member 34. A transmission side end portion of the annular member 37 is locked to an inner end surface 57 of the small diameter end portion 30 of the boot 28.

As described above, the axial position of the annular member 37 is restricted while the annular member 37 is interposed between the stepped portion 55 of the recess 56 of the cylindrical member 34 and the inner end surface 57 of the small diameter end portion 30 of the boot 28.

This allows the power transmission shaft 25 and the inner joint member 13 to be stably fixed. At the same time, this serves to prevent leakage of the lubricant enclosed in the outer joint member 12 and intrusion of foreign material from outside. The small diameter end portion 30 of the boot 28 that configures part of the sealing mechanism 27 has both a sealing function for preventing leakage of the lubricant and intrusion of foreign material, and a fixing function for restricting the axial position of the annular member 37 with respect to the power transmission shaft 25.

Consequently, this eliminates the need for extra parts, such as a retaining ring that restricts the axial position of the annular member 37 and an O-ring that prevents leakage of the lubricant and intrusion of foreign material. Therefore, the number of parts is reduced, the costs of the constant velocity universal joint 11 are reduced, and assembling efficiency is enhanced.

A tapered portion 42 is provided on an inner diameter side of the propeller shaft member side end portion of the annular member 37. When the power transmission shaft 25 and the inner joint member 13 are fixed to each other, the sphere 36 can be smoothly moved along the tapered portion 42 to the radial inner side by the axial movement of the annular member 37.

In the attaching and detaching mechanism 33 configured as above, the sphere 36 exposed from the outer circumferential surface of the cylindrical member 34 is radially moved by the axial movement of the annular member 37. The retaining ring 35 is thus attachable to and detachable from the power transmission shaft 25.

That is, in the constant velocity universal joint 11 according to this embodiment, the attaching and detaching mechanism 33 including the cylindrical member 34, the retaining ring 35, the sphere 36, and the annular member 37 allows the power transmission shaft 25 and the inner joint member 13 to be fixed to and separated from each other as described below with illustration of FIGS. 3 to 5.

FIG. 3 illustrates a state before the power transmission shaft 25 is inserted into the inner joint member 13. FIG. 4 illustrates a state before the inner joint member 13 is fixed to the power transmission shaft 25. FIG. 5 illustrates a state after the inner joint member 13 is fixed to the power transmission shaft 25.

First, as illustrated in FIG. 3, the locking claw 39 of the cylindrical member 34 is fitted into the locking groove 38 of the inner joint member 13, and the cylindrical member 34 is attached to the inner joint member 13. The annular member 37 fits over the outer circumferential surface of the cylindrical member 34.

The sphere 36 is incorporated into the through hole 46 of the cylindrical member 34 and, at the same time, the retaining ring 35 is attached to the recessed groove 43. In this state, the retaining ring 35 is accommodated in the recessed groove 43 of the cylindrical member 34 while the diameter of the retaining ring 35 is increased by the elastic force of the retaining ring 35. The retaining ring 35 with the increased diameter does not drop off to the radial inner side of the cylindrical member 34.

Further, the sphere 36 is pressed toward the radial outer side by the retaining ring 35, and the sphere 36 thus protrudes from the outer circumferential surface of the recess 56 of the cylindrical member 34 to be exposed. Here, the diameter of the outer circumferential side opening portion 47 of the through hole 46 of the cylindrical member 34 is reduced to be smaller than the outer diameter of the sphere 36. The sphere 36 is locked to the outer circumferential side opening portion 47 of the through hole 46. Therefore, the sphere 36 does not drop off to the radial outer side.

Figure 4:
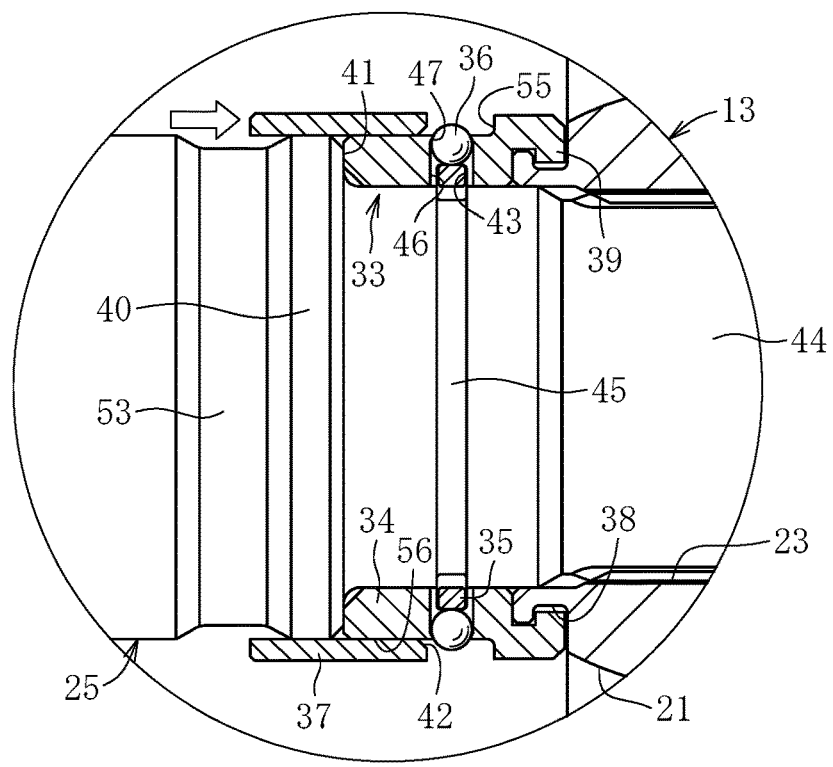
FIG. 4 is a cross-sectional view illustrating a state before the inner joint member is fixed to the power transmission shaft in the attaching and detaching mechanism of FIG. 2.

Next, as illustrated in FIG. 4, the power transmission shaft 25 is inserted into the shaft hole 23 of the inner joint member 13, and then the inner joint member 13 and the power transmission shaft 25 are connected to each other by spline fitting in such a way that torque can be transmitted. Here, the power transmission shaft 25 is inserted until the stepped surface 41 of the large diameter portion 40 of the power transmission shaft 25 comes into contact with a transmission side end portion of the cylindrical member 34.

Until the insertion of the power transmission shaft 25 is completed, the axial movement of the annular member 37 along with the insertion of the power transmission shaft 25 is restricted by a proper means, and the fixation of the annular member 37 is retained.

This allows the retaining ring 35 to be accommodated by the elastic force thereof in the recessed groove 43 of the cylindrical member 34, and thus the retaining ring 35 does not protrude from the inner circumferential surface of the cylindrical member 34. As a result, the retaining ring 35 does not hinder the insertion of the power transmission shaft 25, and the inner joint member 13 is thus easily attached to the power transmission shaft 25.

When the insertion of the power transmission shaft 25 is completed, the recessed groove 45 of the power transmission shaft 25 is disposed at a position corresponding to the retaining ring 35 that is accommodated in the recessed groove 43 of the cylindrical member 34. In this state, the annular member 37 is plunged to the propeller shaft member side (see a white arrow in FIG. 4).

By this axial movement of the annular member 37, the sphere 36 protruding and exposed from the outer circumferential surface of the cylindrical member 34 is pressed with the annular member 37 to the radial inner side of the through hole 46. Here, the sphere 36 is smoothly pressed along the tapered portion 42 of the annular member 37.

Figure 5:
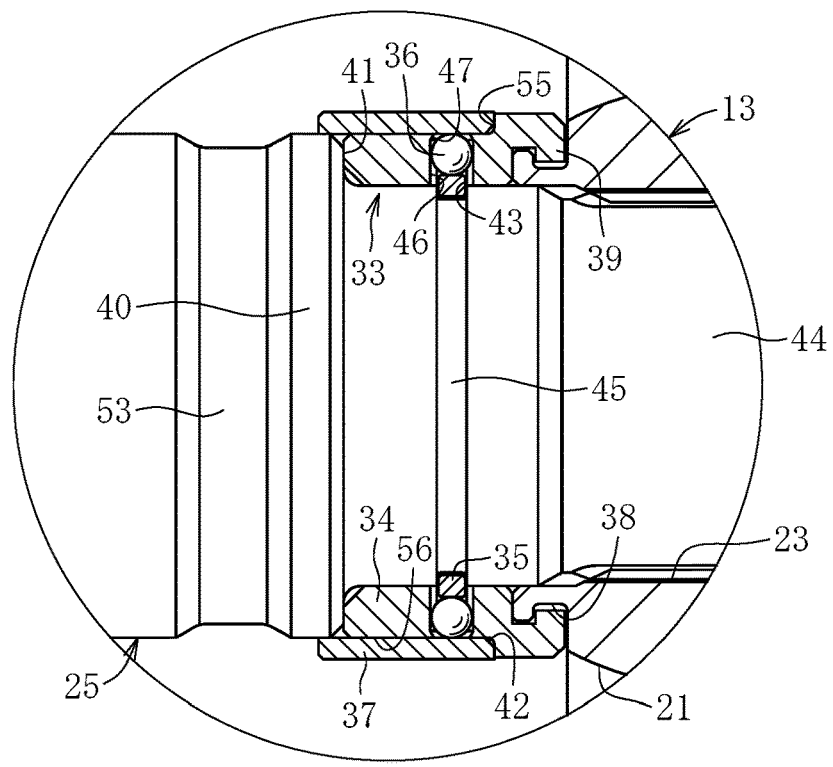
FIG. 5 is a cross-sectional view illustrating a state after the inner joint member is fixed to the power transmission shaft in the attaching and detaching mechanism of FIG. 2.

Then, as illustrated in FIG. 5, the propeller shaft member side end portion of the annular member 37 comes into contact with the stepped portion 55 of the recess 56 of the cylindrical member 34. However, when the sphere 36 is pressed into the through hole 46, the diameter of the retaining ring 35 is reduced against the elastic force of the retaining ring 35. That is, the retaining ring 35 moves to the radial inner side together with the sphere 36. By this movement of the retaining ring 35 to the radial inner side, the inner circumferential side of the retaining ring 35 is fitted into the recessed groove 45 of the power transmission shaft 25.

As described above, the retaining ring 35 that has been pressed by the annular member 37 by means of the sphere 36 is locked to the recessed groove 43 of the cylindrical member 34 and to the recessed groove 45 of the power transmission shaft 25. That is, the power transmission shaft 25 and the inner joint member 13 are fixed to each other by the retaining ring 35 by means of the cylindrical member 34.

Subsequently, as illustrated in FIGS. 1 and 2, the small diameter end portion 30 of the boot 28 is fitted into the recessed groove 53 of the power transmission shaft 25 and fixedly tightened by the boot band 54. The transmission side end portion of the annular member 37 comes into contact with the inner end surface 57 of the small diameter end portion 30 of the boot 28 to restrict the axial position of the annular member 37. This completes the fixation of the power transmission shaft 25 and the inner joint member 13. The inner end surface 57 of the small diameter end portion 30 of the boot 28 presses the annular member 37 with the elastic force of the inner end surface 57, and thus the annular member 37 is interposed and fixed between the stepped portion 55 of the recess 56 of the cylindrical member 34 and the inner end surface 57.

The power transmission shaft 25 and the inner joint member 13 are separated from each other by reversing the above-described operation. In other words, the boot band 54 is relaxed, and the small diameter end portion 30 of the boot 28 is detached from the recessed groove 53 of the power transmission shaft 25 (see FIG. 5).

Then, the annular member 37 is plunged to the transmission side. By this axial movement of the annular member 37, the annular member 37 that has pressed the sphere 36 to the radial inner side is detached from the sphere 36. The diameter of the retaining ring 35 is then increased by the elastic force, and the sphere 36 protrudes from the outer circumferential surface of the cylindrical member 34 to be exposed (see FIG. 4).

This increased diameter of the retaining ring 35 causes the inner circumferential side of the retaining ring 35 to be detached from the recessed groove 45 of the power transmission shaft 25. The retaining ring 35 is entirely accommodated in the recessed groove 43 of the cylindrical member 34, and the retaining ring 35 is released from being locked to the power transmission shaft 25.

Then, the spline fitting part 44 of the power transmission shaft 25 is pulled out of the shaft hole 23 of the inner joint member 13 (see FIG. 3), and the separation of the power transmission shaft 25 and the inner joint member 13 is completed.

The embodiment illustrated in FIGS. 1 and 2 has exemplified the configuration in which the locking claw 39 of the cylindrical member 34 is fitted into the locking groove 38 of the inner joint member 13, the configuration in which the fixing member includes the retaining ring 35, and the configuration in which the propeller shaft member side end portion of the annular member 37 is locked to the stepped portion 55 of the recess 56 of the cylindrical member 34. Alternatively, these configurations may be the attaching and detaching mechanism illustrated in FIGS. 6 and 7.

Figure 6:
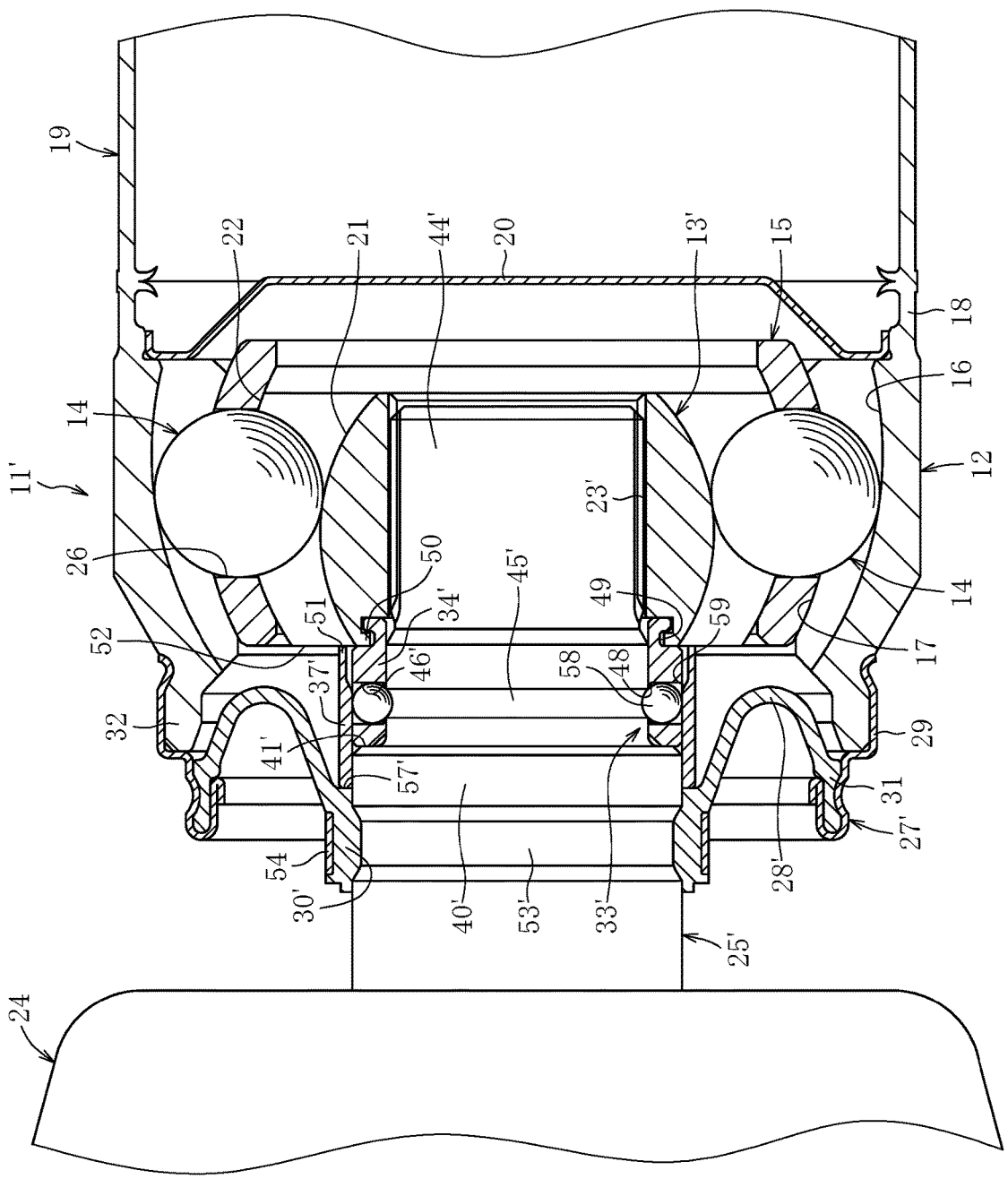
FIG. 6 is a cross-sectional view illustrating an overall configuration of a constant velocity universal joint according to another embodiment of the present invention.
Figure 7:
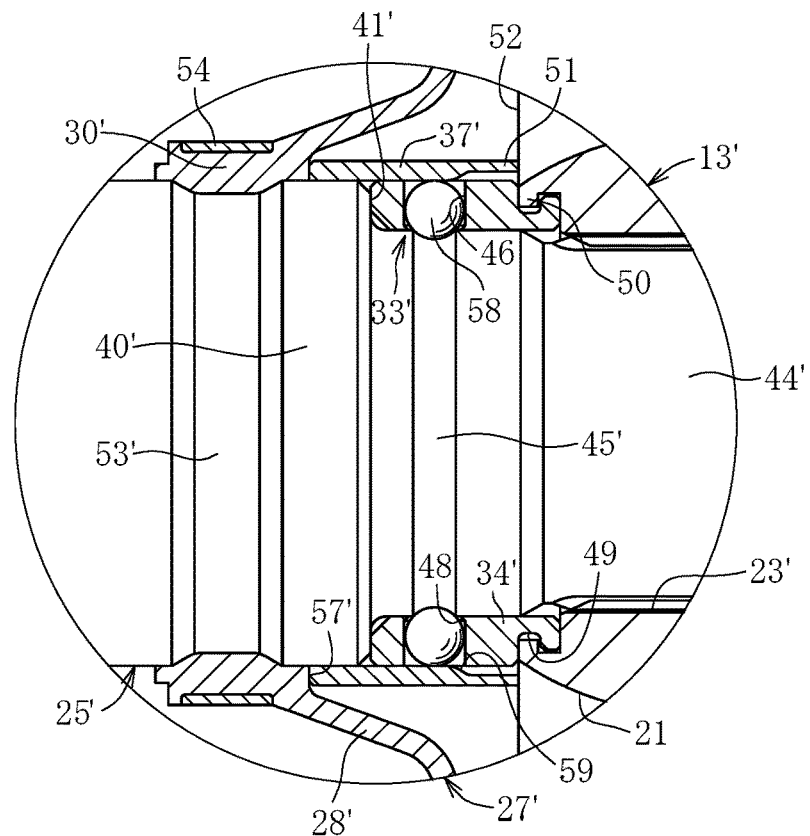
FIG. 7 is an enlarged cross-sectional view of a major part of FIG. 6.

Note that in FIGS. 6 and 7, the same parts as those in FIGS. 1 and 2 are denoted by the same reference signs, and redundant descriptions are omitted.

In this embodiment, as illustrated in FIGS. 6 and 7, a locking groove 49 having an annular shape is provided on an outer circumferential surface of a propeller shaft member side end portion of a cylindrical member 34', and a locking claw 50 having an annular shape is provided on an inner circumferential surface of a transmission side end portion of an inner joint member 13'. The locking claw 50 of the inner joint member 13' is fitted into the locking groove 49 of the cylindrical member 34', whereby the inner joint member 13' and the cylindrical member 34' are connected to each other.

An annular member 37' is disposed on an outer circumferential surface of a large diameter portion 40' of a power transmission shaft 25' and an outer circumferential surface of the cylindrical member 34' so as to be axially movable. The annular member 37' includes a thin portion 51 having a larger inner diameter of the propeller shaft member side end portion than an inner diameter of the transmission side end portion.

The thin portion 51, which is the propeller shaft member side end portion of the annular member 37', is locked to a transmission side end surface 52 of the inner joint member 13'. The transmission side end portion of the annular member 37' is locked to an inner end surface 57' of a small diameter end portion 30' of a boot 28'.

As described above, an axial position of the annular member 37' is restricted while the annular member 37' is interposed between the transmission side end surface 52 of the inner joint member 13' and the inner end surface 57' of the small diameter end portion 30' of the boot 28'.

This allows the power transmission shaft 25' and the inner joint member 13' to be stably fixed. At the same time, this serves to prevent leakage of the lubricant enclosed in the outer joint member 12 and intrusion of foreign material from outside.

The small diameter end portion 30' of the boot 28' that configures part of the sealing mechanism 27' has both a sealing function for preventing leakage of the lubricant and intrusion of foreign material, and a fixing function for restricting the axial position of the annular member 37' with respect to the power transmission shaft 25'.

Consequently, this eliminates the need for extra parts, such as a retaining ring that restricts the axial position of the annular member 37' and an O-ring that prevents leakage of the lubricant and intrusion of foreign material. Therefore, the number of parts is reduced, the costs of the constant velocity universal joint 11' are reduced, and assembling efficiency is enhanced.

A sphere 58, which is a fixing member, is accommodated in a through hole 46' of the cylindrical member 34' so as to be radially movable. A radial movement of the sphere 58 allows the sphere 58 to protrude to and retract from an inner circumferential side opening portion 48 of the through hole 46' of the cylindrical member 34'. Note that the number of the spheres 58 is properly set in accordance with a fixing force required to lock the cylindrical member 34' to the power transmission shaft 25'.

As described above, the sphere 58 is accommodated in the through hole 46' of the cylindrical member 34', and thus the sphere 58 restrains the power transmission shaft 25' by the movement of the sphere 58 to the radial inner side when the power transmission shaft 25' and the inner joint member 13' are fixed to each other. Further, when the power transmission shaft 25' and the inner joint member 13' are separated from each other, the restrained power transmission shaft 25' is released from the sphere 58 by a movement of the sphere 58 to the radial outer side.

The through hole 46' of the cylindrical member 34' reduces the inner diameter of the inner circumferential side opening portion 48 of the cylindrical member 34' to be slightly smaller than an outer diameter of the sphere 58.

Figure 8:
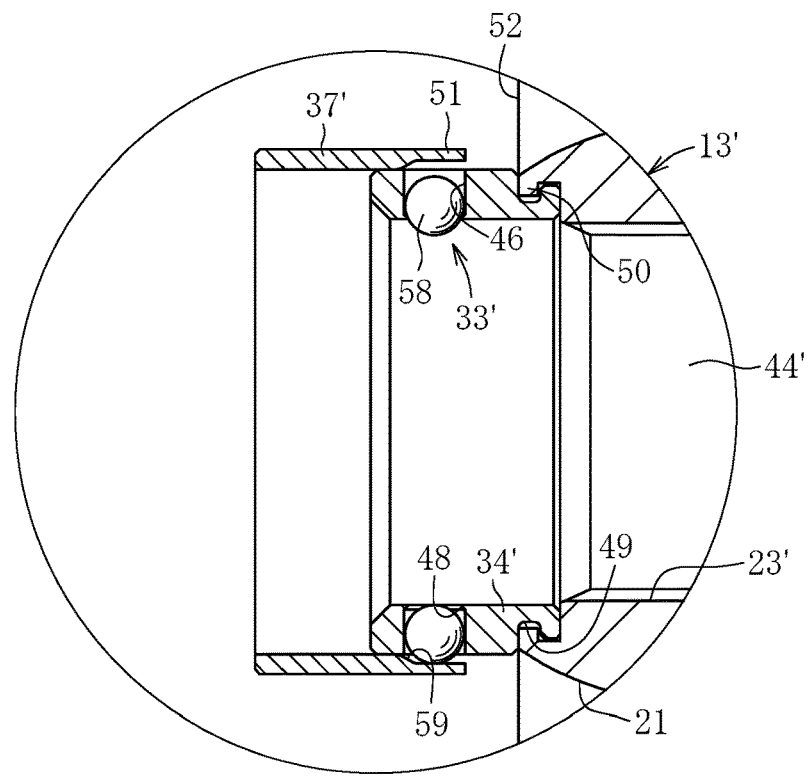
FIG. 8 is a cross-sectional view illustrating a state before a power transmission shaft is inserted into an inner joint member in an attaching and detaching mechanism of FIG. 7.

This prevents the sphere 58 that has been accommodated in the through hole 46' of the cylindrical member 34' from dropping off to an inner diameter side of the cylindrical member 34' due to gravity and the like when the power transmission shaft 25' is not inserted into the cylindrical member 34' (see FIG. 8).

As illustrated in FIGS. 6 and 7, when the annular member 37' restrains the sphere 58 from moving to the radial outer side, the sphere 58 protrudes from an inner circumferential surface of the cylindrical member 34'. In this state, the sphere 58 is fitted into a recessed groove 45' of the power transmission shaft 25', whereby the sphere 58 is locked to the power transmission shaft 25'. When the sphere 58 is released from the annular member 37' restraining the movement of the sphere 58 to the radial outer side, the sphere 58 does not protrude from the inner circumferential surface of the cylindrical member 34'.

A tapered portion 59 is provided on the transmission side of the thin portion 51 of the annular member 37'. When the power transmission shaft 25' and the inner joint member 13' are fixed to each other, the sphere 58 can be smoothly moved along the tapered portion 59 to the radial inner side by an axial movement of the annular member 37'.

The thin portion 51 of the annular member 37' accommodates the sphere 58 that has been released from the restraint of movement to the radial outer side, when the power transmission shaft 25' and the inner joint member 13' are separated from each other. This prevents the sphere 58 from dropping off from the through hole 46' of the cylindrical member 34' to the radial outer side.

That is, the outer diameter of the sphere 58 needs to be larger than a radial dimension of the through hole 46' (a depth of the through hole) of the cylindrical member 34'. This makes it possible to securely lock and detach the sphere 58 to and from the power transmission shaft 25'.

In the attaching and detaching mechanism 33' configured as above, the sphere 58 in the cylindrical member 34' is radially moved by the axial movement of the annular member 37'. The sphere 58 is thus attachable to and detachable from the power transmission shaft 25'.

Figure 9:
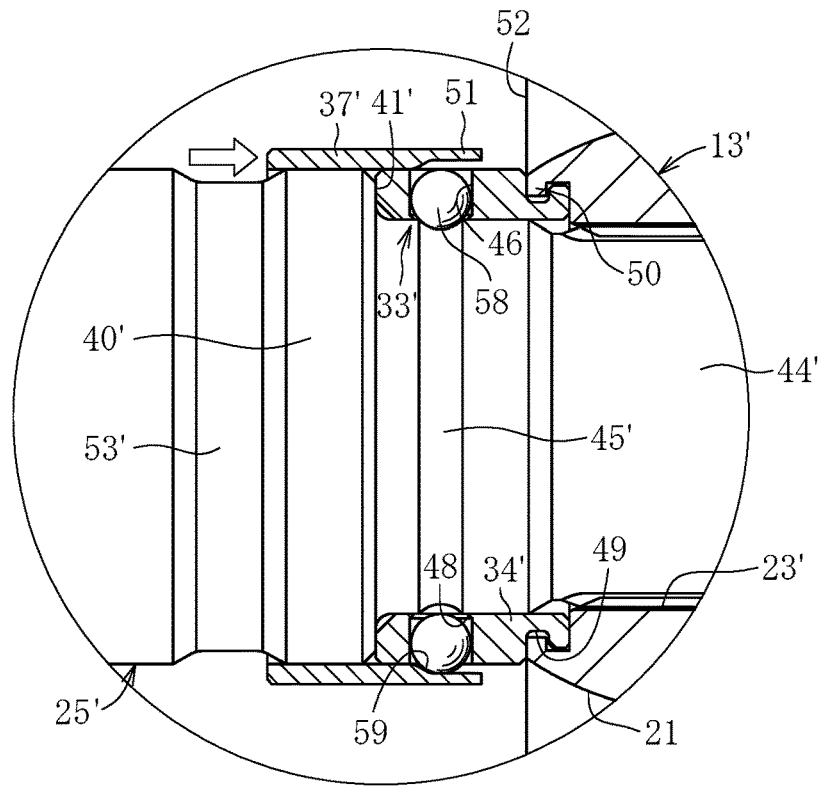
FIG. 9 is a cross-sectional view illustrating a state before the inner joint member is fixed to the power transmission shaft in the attaching and detaching mechanism of FIG. 7.
Figure 10:
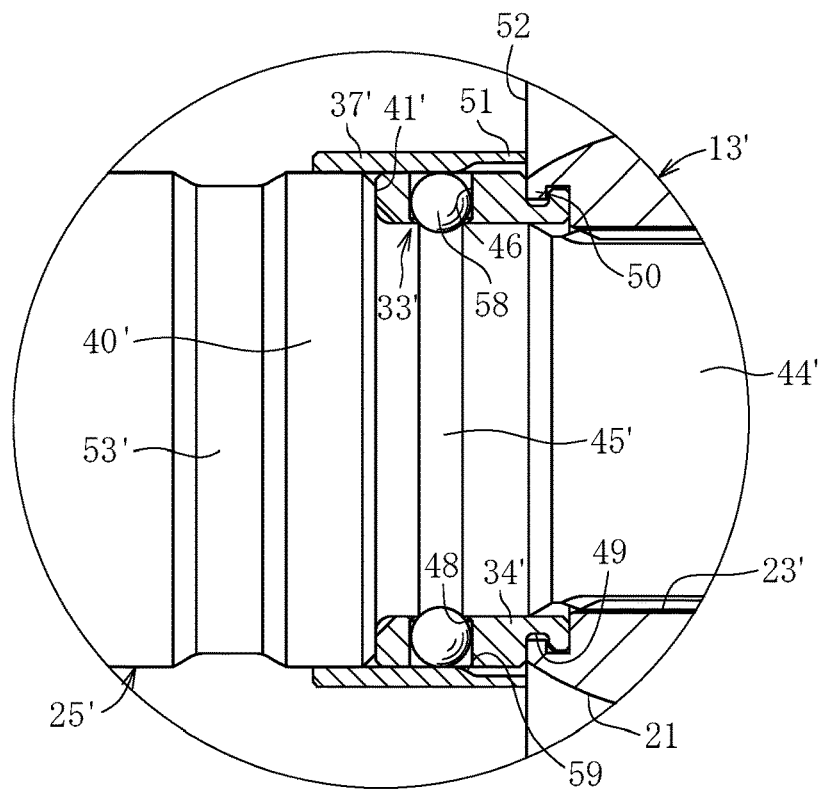
FIG. 10 is a cross-sectional view illustrating a state after the inner joint member is fixed to the power transmission shaft in the attaching and detaching mechanism of FIG. 7.

That is, in the constant velocity universal joint 11' according to this embodiment, the attaching and detaching mechanism 33' including the cylindrical member 34', the sphere 58, and the annular member 37' allows the power transmission shaft 25' and the inner joint member 13' to be fixed to and separated from each other as described below with illustration of FIGS. 8 to 10. Note that FIGS. 8 to 10 illustrate a state where the sphere 58 receives gravity downward from above.

FIG. 8 illustrates a state before the power transmission shaft 25' is inserted into the inner joint member 13'. FIG. 9 illustrates a state before the inner joint member 13' is fixed to the power transmission shaft 25'. FIG. 10 illustrates a state after the inner joint member 13' is fixed to the power transmission shaft 25'.

First, as illustrated in FIG. 8, the locking claw 50 of the inner joint member 13' is fitted into the locking groove 49 of the cylindrical member 34', and the cylindrical member 34' is attached to the inner joint member 13'. The annular member 37' fits over the outer circumferential surface of the cylindrical member 34'.

In this state, the thin portion 51 of the annular member 37' is disposed so as to cover an outer circumferential side opening portion of the through hole 46' of the cylindrical member 34'. This allows the sphere 58 to be accommodated in the thin portion 51 of the annular member 37', and the sphere 58 does not drop off from the through hole 46' of the cylindrical member 34' to the radial outer side.

In addition, the diameter of the inner circumferential side opening portion 48 of the through hole 46' of the cylindrical member 34' is reduced to be smaller than the outer diameter of the sphere 58. The sphere 58 is locked to the inner circumferential side opening portion 48 of the through hole 46'. Therefore, the sphere 58 does not drop off from the inner circumferential side opening portion 48 to the radial inner side.

Next, as illustrated in FIG. 9, the power transmission shaft 25' is inserted into the shaft hole 23' of the inner joint member 13', and the inner joint member 13' and the power transmission shaft 25' are connected to each other by spline fitting in such a way that torque can be transmitted. Here, the power transmission shaft 25' is inserted until the stepped surface 41' of the large diameter portion 40' of the power transmission shaft 25' comes into contact with a transmission side end portion of the cylindrical member 34'.

Until the insertion of the power transmission shaft 25' is completed, the axial movement of the annular member 37' along with the insertion of the power transmission shaft 25' is restricted by a proper means, and the fixation of the annular member 37' is retained.

This allows the sphere 58 to be accommodated in the thin portion 51 of the annular member 37', and thus the sphere 58 does not protrude from the inner circumferential surface of the cylindrical member 34'. Therefore, the sphere 58 does not hinder the insertion of the power transmission shaft 25', and the inner joint member 13' is easily attached to the power transmission shaft 25'.

When the insertion of the power transmission shaft 25' is completed, the recessed groove 45' of the power transmission shaft 25' is disposed at a position corresponding to the sphere 58 exposed from the inner circumferential side opening portion 48 of the through hole 46' of the cylindrical member 34'. In this state, the annular member 37' is plunged to the propeller shaft member side (see a white arrow in FIG. 9).

By this axial movement of the annular member 37', the sphere 58 protruding from the outer circumferential surface of the cylindrical member 34' is pressed with the annular member 37' to the radial inner side of the through hole 46' of the cylindrical member 34'. Here, the sphere 58 is smoothly pressed along the tapered portion 59 of the annular member 37'.

Then, as illustrated in FIG. 10, the propeller shaft member side end portion (a tip of the thin portion 51) of the annular member 37' comes into contact with the transmission side end surface 52 of the inner joint member 13'. The sphere 58 is restrained from moving to the radial outer side by the annular member 37'. Thus, the sphere 58 that has moved to the radial inner side in the through hole 46' of the cylindrical member 34' protrudes from the inner circumferential side opening portion 48 of the through hole 46' and fitted into the recessed groove 45' of the power transmission shaft 25'.

As described above, the sphere 58 that has been pressed by the annular member 37' is locked to the recessed groove 45' of the power transmission shaft 25'. As a result, the power transmission shaft 25' and the inner joint member 13' are fixed to each other by means of the cylindrical member 34'.

Subsequently, the small diameter end portion 30' of the boot 28' is fitted into the recessed groove 53' of the power transmission shaft 25' and fixedly tightened by a boot band 54 (see FIGS. 6 and 7). The transmission side end portion of the annular member 37' comes into contact with the inner end surface 57' of the small diameter end portion 30' of the boot 28' to restrict the axial position of the annular member 37'. This completes the fixation of the power transmission shaft 25' and the inner joint member 13'. The inner end surface 57' of the small diameter end portion 30' of the boot 28' presses the annular member 37' with the elastic force of the inner end surface 57', and thus the annular member 37' is interposed and fixed between the transmission side end surface 52 of the inner joint member 13' and the inner end surface 57'.

The power transmission shaft 25' and the inner joint member 13' are separated from each other by reversing the above-described operation. In other words, the boot band 54 is relaxed, and the small diameter end portion 30' of the boot 28' is detached from the recessed groove 53' of the power transmission shaft 25' (see FIG. 10).

Then, the annular member 37' is plunged to the transmission side. This axial movement of the annular member 37' causes the annular member 37' that has pressed the sphere 58 to the radial inner side to be detached from the sphere 58. The sphere 58 is thus radially movable in the through hole 46', and is released from being locked to the power transmission shaft 25' (see FIG. 9).

Then, a spline fitting part 44' of the power transmission shaft 25' is pulled out of the shaft hole 23' of the inner joint member 13' (see FIG. 8), and the separation of the power transmission shaft 25' and the inner joint member 13' is completed.

The present invention is not limited to the above embodiments, but can be implemented in various embodiments within the scope of the present invention. The scope of the present invention is set forth by the scope of claims, and includes a meaning equivalent to the scope of claims and any modification within the scope of claims.

The invention claimed is:

1. A constant velocity universal joint comprising:
   an outer joint member;
   an inner joint member that transmits torque while permitting angular displacement by means of a torque transmission member between the inner joint member and the outer joint member; and
   a power transmission shaft joined to the inner joint member in such a way that torque can be transmitted,
   wherein an attaching and detaching mechanism is provided between the inner joint member and the power transmission shaft, the attaching and detaching mechanism attaching and detaching the power transmission shaft to and from the inner joint member,
   wherein the attaching and detaching mechanism includes a cylindrical member that fits over the power transmission shaft, a fixing member accommodated in the cylindrical member so as to be radially movable, and an annular member disposed on an outer circumference of the cylindrical member so as to be axially movable,
   wherein an end portion of a boot that closes an opening portion of the outer joint member is fixedly tightened to the power transmission shaft by a boot band to restrict an axial position of the annular member by the end portion of the boot, and
   wherein an end portion of the annular member on a side opposite to the inner joint member in an axial direction is locked to the end portion of the boot.

2. The constant velocity universal joint according to claim 1, wherein a sealing mechanism includes the boot and a metal ring attached to the outer joint member, the boot including a small diameter end portion, as the end portion, fixedly tightened to the power transmission shaft and a large diameter end portion fixedly fastened to the metal ring.

3. The constant velocity universal joint according to claim 1, wherein a recess is formed on an outer circumferential surface of the cylindrical member, and another end portion of the annular member is locked to a stepped portion located on an inner joint member side of the recess.

4. The constant velocity universal joint according to claim 1, wherein another end portion of the annular member is locked to an end surface of the inner joint member.

\* \* \* \* \*